United States Patent [19]
Jerger et al.

[11] Patent Number: 6,112,518
[45] Date of Patent: Sep. 5, 2000

[54] SYSTEM AND METHOD FOR MONITORING A CATALYTIC CONVERTER

[75] Inventors: Robert Joseph Jerger, Livonia; Christopher Kirk Davey, Novi; Michael I. Kluzner, Oak Park; Donald Fenwick Dickison, Sterling Heights, all of Mich.

[73] Assignee: Ford Global Technologies, Inc., Dearborn, Mich.

[21] Appl. No.: 09/340,883

[22] Filed: Jun. 28, 1999

Related U.S. Application Data

[63] Continuation of application No. 08/785,045, Jan. 17, 1997, Pat. No. 5,953,905.

[51] Int. Cl.⁷ .................................................. F01N 3/00
[52] U.S. Cl. ............................. 60/274; 60/277; 60/276
[58] Field of Search ............................. 60/274, 277, 276, 60/285, 278; 701/109

[56] References Cited

U.S. PATENT DOCUMENTS

| | | | |
|---|---|---|---|
| 5,289,678 | 3/1994 | Grutter | 60/277 |
| 5,325,664 | 7/1994 | Seki et al. | 60/276 |
| 5,357,751 | 10/1994 | Orzel | 60/274 |
| 5,381,657 | 1/1995 | Takizawa et al. . | |
| 5,400,592 | 3/1995 | Mukaihira et al. . | |
| 5,412,941 | 5/1995 | Suzuki et al. . | |
| 5,627,757 | 5/1997 | Comignaghi et al. | 364/431.051 |
| 5,632,144 | 5/1997 | Isobe . | |
| 5,673,555 | 10/1997 | Achleitner . | |
| 5,706,652 | 1/1998 | Sultan . | |
| 5,732,551 | 3/1998 | Naber et al. | 60/274 |
| 5,743,082 | 4/1998 | Matsumoto et al. . | |
| 5,865,026 | 2/1999 | Davey et al. | 60/274 |
| 5,945,597 | 8/1999 | Poublon et al. | 73/118.1 |
| 5,953,905 | 9/1999 | Jerger et al. | 60/274 |

FOREIGN PATENT DOCUMENTS

| | | |
|---|---|---|
| 03124909 | 5/1991 | Japan . |
| 05231136 | 9/1993 | Japan . |
| 05231137 | 9/1993 | Japan . |
| 05231138 | 9/1993 | Japan . |
| 05312026 | 11/1993 | Japan . |
| 06093845 | 4/1994 | Japan . |
| 06330741 | 11/1994 | Japan . |
| 07071234 | 3/1995 | Japan . |
| 07293233 | 11/1995 | Japan . |
| 07305644 | 11/1995 | Japan . |
| 07310534 | 11/1995 | Japan . |
| 08004522 | 1/1996 | Japan . |
| 08061052 | 3/1996 | Japan . |
| 08100639 | 4/1996 | Japan . |
| 08105318 | 4/1996 | Japan . |
| 08121147 | 5/1996 | Japan . |

*Primary Examiner*—Thomas Denion
*Assistant Examiner*—Binh Tran
*Attorney, Agent, or Firm*—Allan J. Lippa; Rogers L. May

[57] ABSTRACT

A system and method for monitoring catalytic converter efficiency monitor the switch ratio of upstream and downstream exhaust gas oxygen sensors based on an acceptable temperature range of the catalytic converter. In one embodiment, catalytic converter temperature is determined based on exhaust gas temperature. The exhaust gas temperature may be used to infer the temperature of the catalytic converter mid-bed. The efficiency may be determined based on a correspondence with a number of mass air flow ranges. The system and method may also use vehicle speed and EGR to assure that the monitor samples data during repeatable, robust load-speed-temperature conditions. Switch data is stored in keep-alive memory to increase the confidence of the efficiency determination due to a larger data collection phase. A filter having a cycle based constant may be used to filter a current switch ratio before incorporating it into an average switch ratio.

12 Claims, 3 Drawing Sheets

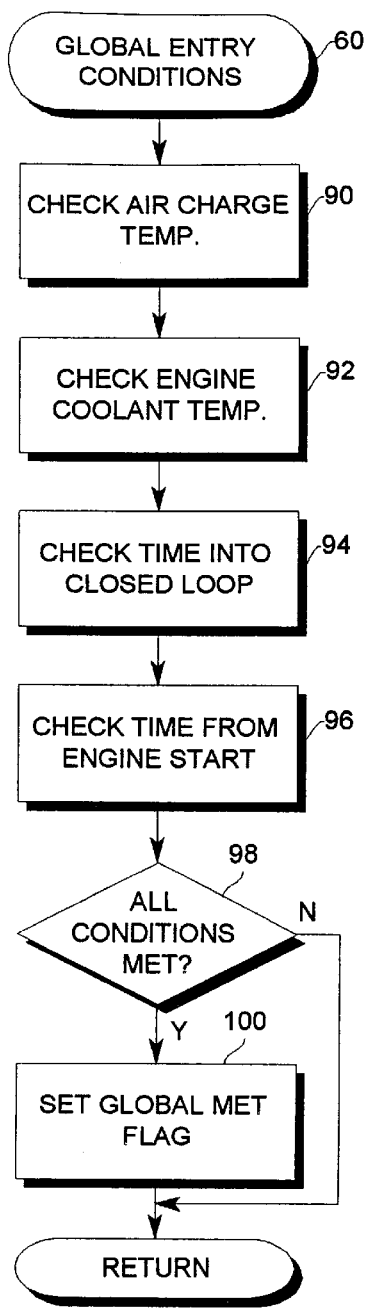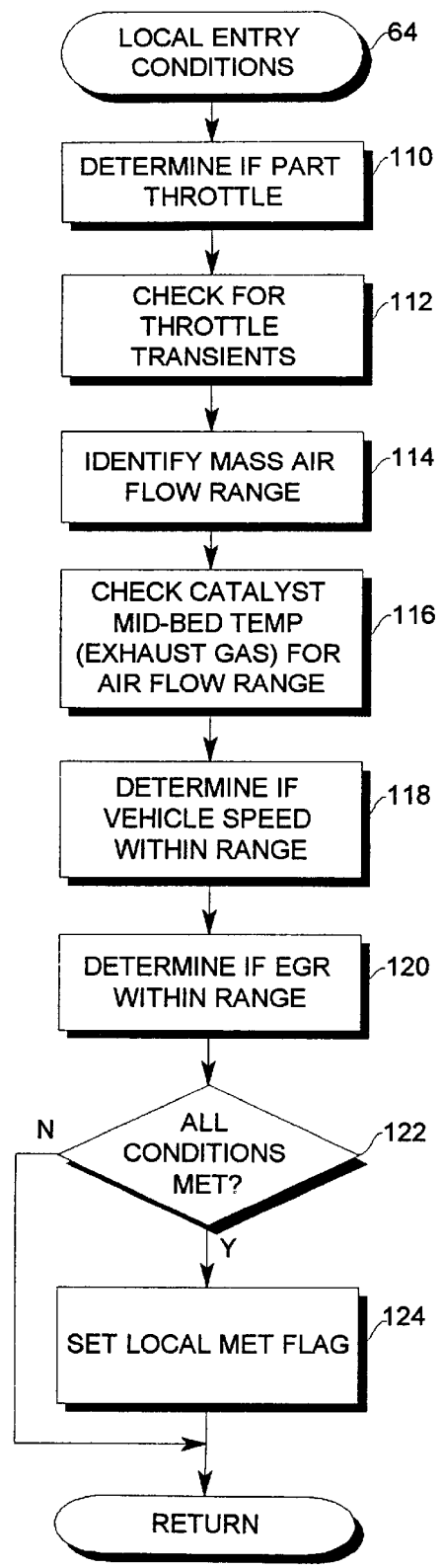
Fig. 3
Fig. 4

SYSTEM AND METHOD FOR MONITORING A CATALYTIC CONVERTER

CROSS-REFERENCE TO RELATED APPLICATION

This application is a continuation of application Ser. No. 08/785,045, filed on Jan. 17, 1997, U.S. Pat. No. 5,953,905 and assigned to the assignee of the present invention.

TECHNICAL FIELD

The present invention relates to systems and methods for monitoring a catalytic converter.

BACKGROUND ART

An internal combustion engine emits exhaust gases consisting of products from the combustion of fuel within the engine. During complete combustion, the hydrocarbons (HC) in the fuel are broken down to release energy and form carbon dioxide ($CO_2$) and water ($H_2O$). Complete combustion requires a chemically balanced, or stoichiometric reaction. Unfortunately, neither optimum power generation nor optimum fuel economy occurs under these conditions. Furthermore, it is very difficult to maintain the proper conditions for complete combustion due to the large number of variables present in an operating engine.

Products of incomplete combustion of an air fuel mixture include carbon monoxide (CO), oxides of nitrogen ($NO_x$), and hydrocarbons. Increasingly stringent federal regulations limit the permissible levels for emissions of these gases. As such, vehicle manufacturers have developed various methods to reduce emissions while improving vehicle performance and fuel economy.

Exhaust emissions of regulated gases may be reduced by closely controlling the mass ratio of air to fuel provided to the engine. For a gasoline powered internal combustion engine, the mass ratio for complete fuel combustion is about 14.7:1, i.e. 14.7 kilograms of air to 1 kilogram of fuel. This ratio is known as the stoichiometric ratio.

The air fuel ratio is often described in terms of the excess-air factor, lambda ($\lambda$). This ratio indicates the deviation of the air fuel ratio from the theoretically required stoichiometric ratio. At the stoichiometric ratio, lambda is equal to 1. For a mixture with excess air, also known as a lean mixture, lambda is greater than 1. For a mixture with deficient air or excess fuel, also known as a rich mixture, lambda is less than 1. For rich mixtures, HC and CO emissions increase while $No_x$ emissions decrease. The converse is true for lean mixtures. As such, to minimize emissions, it is desirable to operate the engine at the stoichiometric ratio.

Closed-loop control is effected by the Engine Control Module (ECM) to regulate the air fuel ratio under various operating conditions. Because it is difficult to measure many of the variables which affect the combustion process, the ECM controls lambda using an exhaust gas oxygen sensor coupled to the engine exhaust stream. This sensor provides a feedback signal to the ECM indicative of oxygen content of the exhaust gas.

One such sensor, well known in the art, is the heated exhaust gas oxygen (HEGO) sensor. The HEGO sensor is generally a bistable device which provides a voltage of about 0.1 volts when oxygen is detected and about 0.8 volts when oxygen is not detected, generally corresponding to lean and rich mixtures, respectively. The ECM then uses the sensor signal to modify the air fuel mixture supplied to the engine to maintain the stoichiometric ratio.

To further reduce emissions, a catalytic converter is typically installed in the exhaust system of the engine. The converter includes a catalyst to promote chemical reactions that transform the exhaust emissions to primarily water and carbon dioxide. The most commonly used converter is the three-way converter (TWC). As the name implies, it simultaneously reduces the concentration of all three regulated exhaust gases: HC, CO, and $NO_x$.

The catalyst includes catalytic sites which have the ability to store and release oxygen to promote reactions that oxidize HC and CO, converting them into $CO_2$ and $H_2O$, while reducing $NO_x$ into $N_2$. The catalytic sites may become contaminated and lose their ability to store and release oxygen as the converter ages. The filtering effect, or conversion efficiency, of the catalyst decreases as the number of contaminated sites increases. The efficiency is a measure of the effectiveness of the catalyst in transforming the exhaust gases to water and carbon dioxide.

To monitor the conversion efficiency of the catalytic converter, an additional exhaust gas oxygen sensor may be used. Due to its function, this sensor may be referred to as the catalyst monitoring sensor (CMS) even though it functions in a similar manner as the HEGO sensor. While the HEGO sensor is positioned upstream of the converter, between the engine and the converter, the CMS is positioned downstream of the converter.

One method known in the art for monitoring converter efficiency is to calculate a ratio of CMS transitions or switches to HEGO transitions or switches. If the ratio is high, the catalyst has a small filtering effect and its efficiency is low. If the ratio is low, the catalyst has a large filtering effect and its efficiency is high. Thus, the bulk conversion efficiency of the catalyst may be inferred from the switch ratio, which generally increases over time.

Catalytic converter efficiency may vary greatly depending upon the particular operating conditions. For example, catalyst temperature, exhaust gas mass flow rate, and exhaust gas concentration may affect the ability of the catalyst to operate properly. Thus, to detect bulk degradation of the catalyst, it is necessary to monitor the conversion efficiency over time under similar operating conditions. An accurate determination of the converter efficiency is necessary to reduce unnecessary warranty repairs or the potential of a poor catalyst being undetected.

While the prior art methods are sufficient to monitor conversion efficiency to meet current emission regulation levels, they may be less accurate under the progressively stricter regulations for low emission vehicles (LEVs) and ultra-low emission vehicles (ULEVs). As such, it is desirable to improve the sensitivity of the catalytic converter monitor while increasing its repeatability and confidence level to reduce unnecessary warranty costs.

DISCLOSURE OF THE INVENTION

It is thus a general object of the present invention to provide a method and system for determining the efficiency of a catalytic converter.

A further object of the present invention is to provide a system and method for monitoring a catalytic converter having increased sensitivity and improved capability to meet LEV and ULEV requirements.

In carrying out the above objects and other objects, features and advantages of the present invention, a method for monitoring efficiency of a catalytic converter for an internal combustion engine using upstream and downstream exhaust gas sensors includes measuring exhaust gas temperature, determining whether exhaust gas temperature is within an acceptable temperature range to initiate monitoring, counting transitions in response to a change in output signal level for the upstream and downstream sensors based on the exhaust gas temperature being within the acceptable temperature range, and generating an indication of the efficiency of the catalytic converter based on a ratio of the downstream sensor transitions and the upstream sensor transitions. The method may also include determining whether speed of the vehicle is within an acceptable speed range and counting transitions based on the speed of the vehicle being within the acceptable speed range.

In one embodiment, the method includes calculating an average transition ratio based on previously determined transition ratios. The current ratio may be filtered using filter constants based on the number of completed test cycles before being incorporated into the average ratio. The step of generating an indication of the converter efficiency is then based on the average ratio rather than the current ratio.

The advantages associated with the present invention are numerous. For example, the present invention uses various parameter normalization factors to significantly reduce the impact of signal noise present in prior art systems due to varying EGR, vehicle speeds and catalyst temperatures occurring during data collection. The present invention provides efficiency determination based on larger data sets while maintaining the capability to complete within one cycle as required by current regulations.

The above object and other objects, features, and advantages of the present invention, will be readily apparent from the following detailed description of the best mode for carrying out the invention when taken in connection with the accompanying drawings.

BRIEF DESCRIPTION OF THE DRAWINGS

FIG. 3 is a flow diagram illustrating tests for global entry conditions according to the present invention;

FIG. 4 is a flow diagram illustrating tests for local entry conditions according to the present invention.

BEST MODE FOR CARRYING OUT THE PREFERRED EMBODIMENT

Figure 1:
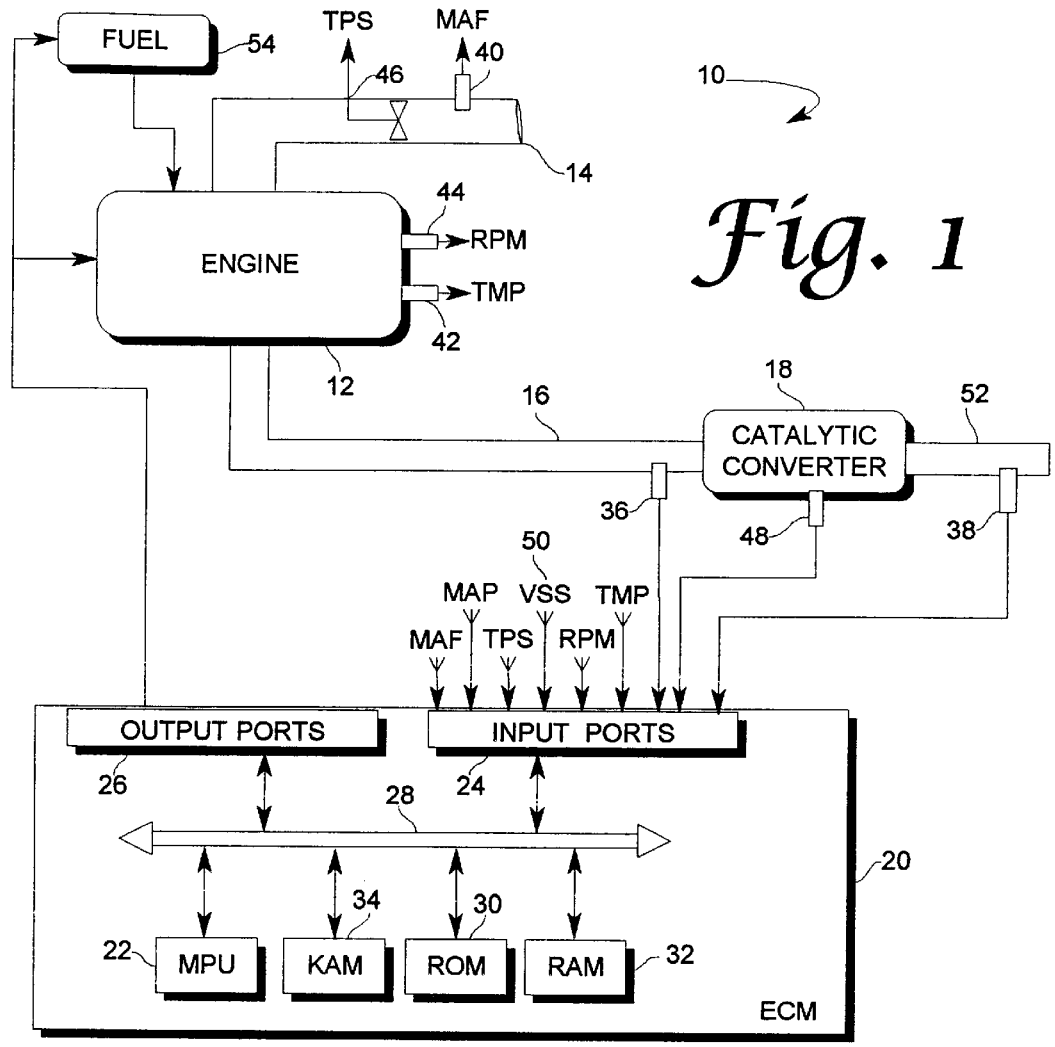
FIG. 1 is a block diagram of a system for monitoring a catalytic converter according to the present invention.

Referring now to FIG. 1, a block diagram illustrating a system for monitoring efficiency of a catalytic converter is shown. System 10 includes an internal combustion engine 12 having an intake 14 and an exhaust 16. The catalytic converter 18 is connected to exhaust 16 and a downstream section 52. An Engine Control Module (ECM) 20 includes a microprocessor 22 in communication with engine 12 via input ports 24 and output ports 26. Data and control bus 28 provides communication between microprocessor 22, input ports 24, output ports 26 and various memories such as Read-Only Memory (ROM) 30, Random Access Memory (RAM) 32 and Keep-Alive Memory (KAM) 34.

As is known, ROM 30 contains various program instructions, software, or control logic to effect control of engine 12. ROM 30 may also include non-modifiable parameter values. Because ROM 30 is a non-volatile memory, power is not needed to maintain its contents. In contrast, RAM 32 is used for various working calculations and temporary storage of information. The contents of RAM are lost when power is removed, such as when the ignition key is turned off. KAM 34 is used to store various adaptive or learned parameters and is not reset when the engine is turned off.

ECM 20 receives signals from various sensors which reflect current operating conditions of engine 12. Heated Exhaust Gas Oxygen sensor (HEGO) 36 is used to detect the presence of oxygen in exhaust 16. HEGO sensor 36 communicates with ECM 20 via input port 24. Similarly, Catalyst Monitor Sensor (CMS) 38 monitors the presence or absence of oxygen in downstream exhaust 52 and provides a signal to ECM 20 via input port 24. Mass air flow sensor 40 provides an indication of the air flow mass through intake 14. Temperature sensor 42 provides an indication of the engine coolant temperature while RPM sensor 44 provides an indication of the current engine RPM. Other sensors connected to ECM 20 through input ports 24 include Throttle Position Sensor (TPS) 46, exhaust gas temperature sensor 48 and Vehicle Speed Sensor (VSS) 50.

ECM 20 uses control logic implemented in hardware and software to generate various signals to control engine 12. For example, ECM 20 generates an output signal to control fuel delivered to engine 12 by fuel control 54. ECM 20 controls the quantity and timing of fuel injection in addition to spark timing via signals passing through output ports 26. Temperature sensor 48 may be used to monitor the exhaust gas temperature from which the catalytic converter mid-bed temperature may be inferred.

In operation, ECM 20 is used to monitor performance of catalytic converter 18 using HEGO sensor 36 and CMS 38. ECM 20 calculates a ratio of observed transitions of CMS 38 to transitions of HEGO sensor 36 after an acceptable number of observed transitions of HEGO sensor 36 have occurred. ECM 20 determines performance of the catalytic converter based on the transition ratio. Transitions are observed based on temperature of a catalyst within catalytic converter 18 being within an acceptable temperature range as explained in greater detail herein. The catalyst temperature may be monitored by temperature sensor 56 or may be inferred from temperature of the exhaust gas. In one embodiment, KAM 34 is used to store ratios calculated from previous cycles. An average ratio is then determined based on a filtered current ratio and the ratios calculated from previous cycles.

In another embodiment, an acceptable temperature range is stored in ROM 30 for each of a plurality of mass air flow ranges. ECM 20 then uses MAF sensor 40, which provides an indication of mass air flow into the engine, so that ECM 20 can determine which mass air flow range and corresponding temperature range to use in determining transitions of HEGO sensor 36.

Figure 2:
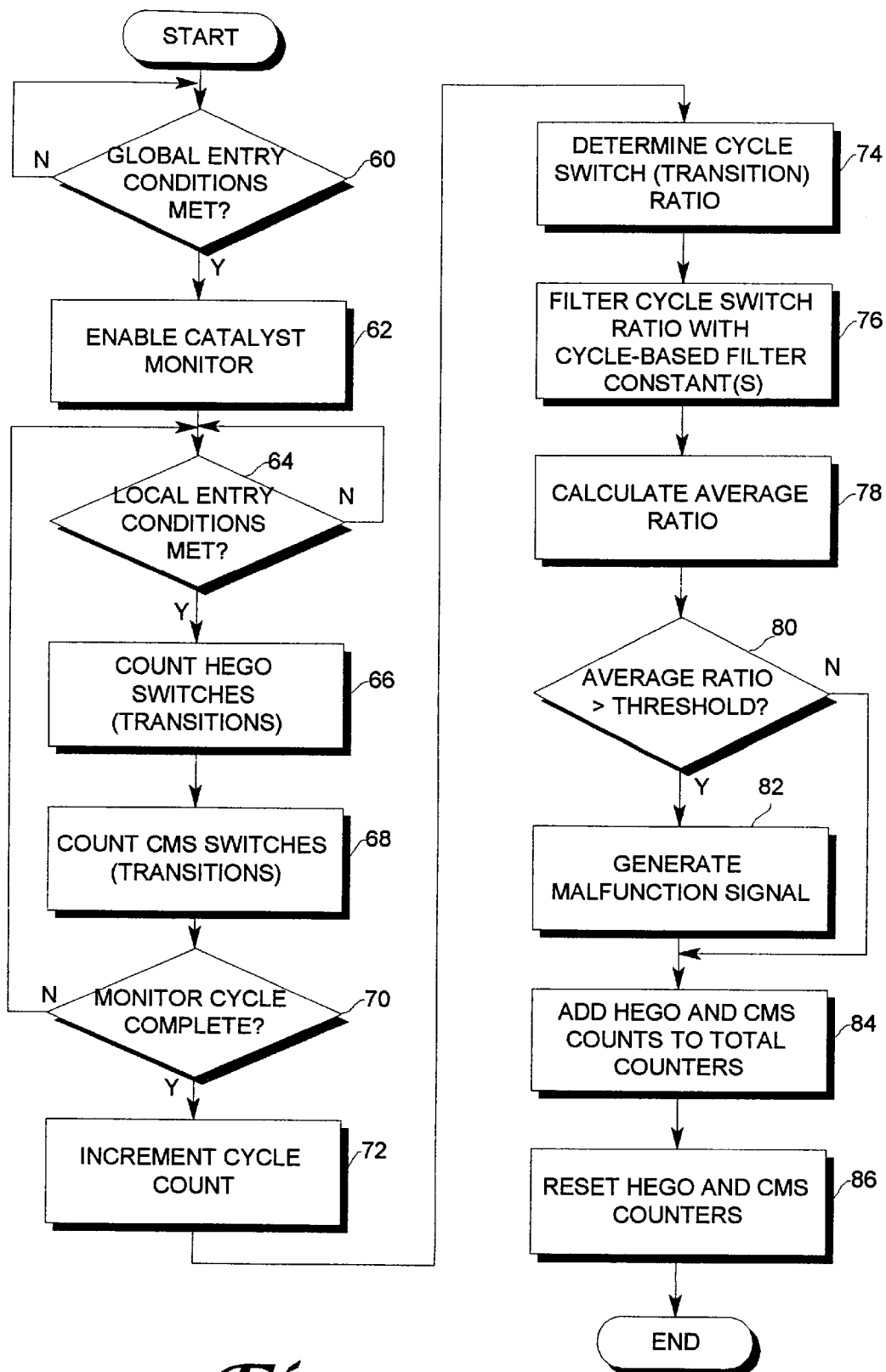
FIG. 2 is a flow diagram illustrating operation of a system and method for monitoring the catalytic converter efficiency according to the present invention.

Referring now to FIG. 2, a flow diagram illustrating operation of the system and method for monitoring a catalyst according to the present invention is shown. As one of ordinary skill in the art will appreciate, the various functions or operations shown may be performed by software, hardware, or a combination of hardware and software. Furthermore, the particular order of operations illustrated may not be necessary to accomplish the objects and advantages according to the present invention. Sequential operation is shown for ease of illustration only. For example, multi-tasking, interrupt driven, or parallel computing strategies may be used to implement the illustrated control logic.

Similarly, one of ordinary skill will recognize various equivalent implementations to accomplish the objects and advantages of the present invention.

A method for monitoring efficiency of a catalytic converter according to the present invention begins with determining whether global entry conditions are met as indicated by block 60. As noted above, it is desirable to monitor efficiency under similar operating conditions to provide an accurate indication of converter degradation. Thus, various global entry conditions must be met prior to enabling the catalyst monitor as indicated by block 62. This step attempts to insure that the engine and catalytic converter, HEGO sensor, CMS sensor, and engine have warmed-up sufficiently.

Referring now to FIG. 3, a flow diagram illustrating the global entry conditions represented by block 60 of FIG. 2 is shown. Block 90 represents a check to determine whether the air charge temperature is within a predetermined range. Similarly, block 92 checks the engine coolant temperature to assure that it is within a predetermined range. Block 94 determines whether the engine has been operating in closed-loop mode for a sufficient period of time. Block 96 determines whether a sufficient time has elapsed from the last engine start. If all these conditions are met as indicated by block 98, an appropriate flag is set as indicated by block 100.

Returning now to FIG. 2, the catalyst monitor is enabled when all the global entry conditions are met as indicated by block 62. If any of the global entry conditions are not met, or are met and subsequently cease to be met, control returns to block 60 until all global entry conditions are met. Once the monitor is enabled, block 64 determines whether local entry conditions have been met as described in detail with reference to FIG. 4.

Referring now to FIG. 4, a flow diagram illustrating local entry conditions is shown. Block 110 determines whether the engine is under part throttle conditions, i.e., greater than idle and less than full throttle. Block 112 checks for throttle transients by monitoring TPS signal 46.

With continuing reference to FIG. 4, block 114 identifies the current mass air flow range. Mass air flow values typically seen under normal operation of the engine are divided into a number of ranges, primarily based upon empirical data. Preferably, the mass air flow ranges are between 0.25 and 0.5 pounds per minute (ppm) with a maximum of 9 flow ranges. As such, block 114 determines which of the air flow ranges applies based on the current mass air flow as determined by MAF sensor 40.

Block 116 checks the catalyst mid-bed temperature corresponding to the air flow range determined by block 114. Preferably, each air flow range includes a temperature range for the catalyst mid-bed. The mid-bed temperature of the catalyst may be inferred from the exhaust gas temperature or, alternatively, from an appropriate temperature sensor within the catalytic converter. Block 118 determines whether the vehicle speed is within an acceptable range for monitoring the converter. Similarly, block 120 determines whether EGR is within an acceptable range. As is known, EGR (Exhaust Gas Recirculation) is used to lower the average combustion temperature within the cylinders to reduce $NO_x$ emissions. Block 122 determines whether all of the local entry conditions have been met, in which case an appropriate flag is set as indicated by block 124. If any of the conditions 110 through 120 are not met, or cease to be met, then the flag is not set (or reset) and control returns to block 64 of FIG. 2.

Returning now to FIG. 2, once the global and local entry conditions are met, transitions or switches of the HEGO and CMS sensors are counted as indicated by block 66 and 68. If any of the global entry conditions or local entry conditions are not met, the transitions are not "observed," i.e. they are not counted even though they may occur because they do not provide an accurate indication of the bulk catalytic converter efficiency. As such, transitions or switches are observed only under controlled or normalized conditions.

Since the HEGO sensor is positioned upstream from the catalytic converter and provides voltage signals indicative of excursions from a stoichiometric combustion mixture, while the CMS sensor is positioned downstream from the catalytic converter and provides voltage signals indicative of conversion efficiency in the converter, the switches or transitions must be defined differently for the two sensors. For the HEGO sensor, a transition or switch occurs when the voltage signal crosses a switching threshold, such as 0.45 volts. The CMS voltage signal is generally biased from 0.45 volts while its frequency is the same as the signal from the HEGO sensor. A CMS switch is defined as a change in signal voltage amplitude that exceeds a calibratable value. The CMS signal from a good catalyst will have a low peak-to-peak amplitude and therefore few switches. The CMS signal from an inefficient or poor catalyst will have large peak-to-peak amplitude changes and therefore many switches or transitions.

Block 70 of FIG. 2 determines whether a monitor cycle is complete. For the monitor cycle to complete, a predetermined number of switches of the HEGO sensor must occur to assure a large enough sample size to provide an accurate indication of the converter efficiency. In one embodiment of the present invention, a predetermined number of HEGO switches must occur in each of the predefined mass air flow ranges to complete a monitor cycle. If the predetermined number of switches has not been observed for each of the mass air flow ranges, control is returned to block 64 and the monitor continues to count HEGO switches and CMS switches whenever local entry conditions are met. Once the cycle is complete, a cycle counter is incremented as indicated by block 72. A switch ratio is calculated based on the number of CMS switches and the number of HEGO switches. An efficient converter will have a relatively low switch ratio, i.e. 0.1–0.2. To discriminate between efficient and degraded catalytic converters, a degraded converter should have a relatively high switch ratio, i.e. 0.7–0.9. The monitor should be able to provide a separation of at least four standard deviations between the mean switch ratio of a good catalyst and the −3 sigma switch ratio of a bad catalyst.

The switch ratio for the current cycle is then filtered using at least one cycle-based filter constant as indicated by block 76 before being incorporated into an average ratio as indicated by block 78. Different filter constants may be applied to meet various government regulations. For example, a first filter constant may be used for the first two cycles or trips while a second filter constant is used for subsequent cycles or trips. This provides for a rapid response to quickly detect a bad catalyst with a slower decay so that efficiency determinations are made based on a larger data set. The larger data set provides greater accuracy to reduce false efficiency indications and associated warranty costs.

If the average ratio is greater than an acceptable threshold as indicated by block 80, a malfunction signal is generated as indicated by block 82. Otherwise, control passes to block 84. The malfunction signal generated by block 82 may be used to alert the vehicle operator to an abnormal condition. For example, a malfunction signal may be used to illuminate a "check engine" light indicating that service may be required. After a cycle is completed, the HEGO and CMS counters are added to total counters as indicated by block 84. The total switch counters are preferably stored in keep-alive memory so that they are not reset when the engine is turned off. This provides a larger data set for more accurate determinations as described above. The current cycle HEGO and CMS counters are then reset as indicated by block 86.

Figure 5:
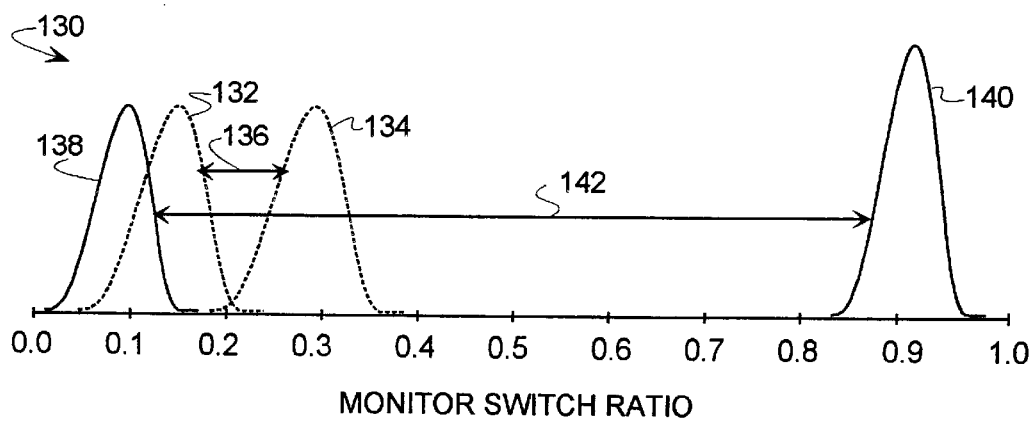
FIG. 5 is a graphical representation of the improvement in discrimination between good and bad catalytic converters using the system or method of the present invention.

Referring now to FIG. 5, a graphical representation of the significant improvement provided by the present invention is shown. Switch ratio distribution functions 130 are used to discriminate between good and degraded catalysts. Using prior art techniques, emission level limits imposed by regulations for LEVs and ULEVs would result in distribution function 132 for a good catalyst after 100,000 miles and distribution function 134 for a degraded catalyst, which would require a malfunction indication. The relatively small separation, indicated generally by reference numeral 136, makes it difficult to determine good catalysts from degraded catalysts and leads to a number of false "bad" indications. Applying the teaching of the present invention results in probability distributions for good and degraded catalysts as represented by distribution functions 138 and 140, respectively. This provides a significantly larger separation 142 such that discrimination may be made with greater accuracy and confidence.

The present invention has reduced standard deviation in the switch ratio from about 0.04 for distribution functions 132 and 134 to about 0.025 for distribution functions 138 and 140.

Contributions to the overall reduction in standard deviation were provided by adding the entry conditions for EGR, vehicle speed, and the catalyst mid-bed temperature. The EGR entry condition reduced standard deviation from about 0.10 using the prior art method to about 0.06 with the present invention. The vehicle speed entry condition also reduced standard deviation from 0.10 to 0.06. The most dramatic reduction was provided by the temperature range entry conditions. The prior art catalyst monitor exhibited a standard deviation of about 0.13. Integration of the temperature ranges according to the present invention reduced the standard deviation to about 0.06. The unique modifications provided by the present invention insure that the catalyst is monitored only during repeatedly, robust load-speed-temperature conditions.

While the best mode for carrying out the invention has been described in detail, those familiar with the art to which this invention relates will recognize various alternative designs and embodiments for practicing the invention as defined by the following claims.

What is claimed is:

1. A method for monitoring efficiency of a catalytic converter for an internal combustion engine using upstream and downstream exhaust gas sensors, the method comprising:
   measuring exhaust gas temperature by determining a mid-bed temperature of the catalytic converter;
   determining whether exhaust gas temperature is within an acceptable temperature range to initiate monitoring;
   counting transitions in response to a change in output signal level for the upstream and downstream sensors based on the exhaust gas temperature being within the acceptable temperature range;
   generating an indication of the efficiency of the catalytic converter based on a ratio of the downstream sensor transitions and the upstream sensor transitions; and
   generating a malfunction indicator signal when the ratio exceeds an adaptable threshold ratio.

2. The method of claim 1 further comprising generating a malfunction indicator signal when the ratio exceeds a threshold ratio.

3. The method of claim 1 wherein the step of determining comprises:
   selecting a current air flow range from a plurality of air flow ranges based on a current engine air flow wherein each of the plurality of air flow ranges has a corresponding acceptable temperature range; and
   wherein the step of counting transitions associates each transition with the current air flow range.

4. A method of monitoring efficiency of a catalytic converter installed on a vehicle using upstream and downstream exhaust gas sensors, the method comprising:
   measuring exhaust gas temperature;
   determining whether exhaust gas temperature is within an acceptable temperature range to initiate monitoring;
   determining whether speed of the vehicle is within an acceptable speed range;
   counting transitions in response to a change in output signal level for the upstream and downstream sensors based on the exhaust gas temperature being within the acceptable temperature range and the speed of the vehicle being within the acceptable speed range; and
   generating an indication of the efficiency of the catalytic converter based on a ratio of the downstream sensor transitions and the upstream sensor transitions.

5. A method of monitoring efficiency of a catalytic converter for an internal combustion engine which uses variable exhaust gas recirculation, the method comprising:
   measuring exhaust gas temperature;
   determining whether exhaust gas temperature is within an acceptable temperature range to initiate monitoring;
   determining amount of exhaust gas recirculation;
   counting transitions in response to a change in output signal level for the upstream and downstream sensors based on the exhaust gas temperature being within the acceptable temperature range and the amount of exhaust gas recirculation being within an acceptable exhaust gas recirculation range; and
   generating an indication of the efficiency of the catalytic converter based on a ratio of the downstream sensor transitions and the upstream sensor transitions.

6. The method of claim 5 wherein the step of generating is performed in response to attainment of a predetermined number of upstream sensor transitions so as to establish a current cycle ratio.

7. The method of claim 6 further comprising
   calculating an average ratio based on previously determined cycle ratios, wherein the step of generating an indication of the converter efficiency is based on the average ratio.

8. The method of claim 7 wherein the step of calculating comprises:
   filtering the current cycle ratio using a filter having at least one filter constant based on a number of completed cycles to produce a filtered current cycle ratio; and
   modifying the average ratio based on the filtered current cycle ratio and a previously calculated average.

9. A computer readable storage medium having stored data representing instructions executable by a computer to monitor efficiency of a catalytic converter for an internal combustion engine using upstream and downstream exhaust gas sensors, the computer readable storage medium comprising:

instructions for determining an exhaust gas temperature based on a corresponding measurement;

instructions for determining whether the exhaust gas temperature is within an acceptable temperature range to initiate monitoring;

instructions for counting transitions in response to a change in output signal level for the upstream and downstream sensors based on the exhaust gas temperature being within the acceptable temperature range;

instructions for generating an indication of the efficiency of the catalytic converter based on a ratio of the downstream sensor transitions and the upstream sensor transitions;

instructions for determining amount of exhaust gas recirculation; and wherein the instructions for counting transitions include instructions for counting transitions based on the amount of exhaust gas recirculation being within an acceptable exhaust gas recirculation range.

10. The computer readable storage medium of claim 9 further comprising instructions for generating a malfunction indicator signal when the ratio exceeds a threshold ratio.

11. The computer readable storage medium of claim 9 further comprising instructions for determining catalytic converter temperature based on exhaust gas temperature.

12. The computer readable storage medium of claim 9 further comprising:

instructions for determining whether vehicle speed is within an acceptable speed range; and wherein the instructions for counting transitions include instructions for counting transitions based on the vehicle speed being within the acceptable speed range.

* * * * *